UNITED STATES PATENT OFFICE.

THUSNELDA C. PRIMAVESE, OF CORONA, NEW YORK.

PROCESS FOR DESICCATING EGGS.

1,226,999.  Specification of Letters Patent.  Patented May 22, 1917.

No Drawing.  Application filed March 12, 1917.  Serial No. 154,090.

*To all whom it may concern:*

Be it known that I, THUSNELDA C. PRIMAVESE, a citizen of the United States, residing at Corona, Long Island, New York, have invented certain new and useful Improvements in Processes for Desiccating Eggs, of which the following is a clear, full, and exact description.

My invention relates to a process for desiccating eggs. Its object is to provide a method for producing desiccated eggs which will result in an improved product and which shall not involve the use of complicated apparatus or highly skilled manipulation of the product during its manufacture.

I have found that the addition of a certain amount of lemon juice to the white or yolk of an egg, or to both together, before drying the same will prevent the deterioration of the desiccated product.

In the application of my discovery, the eggs are first removed from their shells and then strained to remove the embryos from the yolks. The yolks and whites are then thoroughly beaten. There is then added about four per cent. (4%) by weight of lemon juice which has previously been strained. The compound of egg meat and lemon juice is then thoroughly mixed so as to distribute the lemon juice uniformly throughout the egg meat. The mixture is spread in thin layers or sheets on smooth surfaces of enamel, porcelain, glass or the like, and in this condition is subjected to a temperature of about 75 to 80° F. and allowed to stand over night, or as long as may be required to thoroughly dry it. It can then be picked off in little flakes and either remain as such or be ground into powder. While a temperature of 75 to 80° F. produces satisfactory results, temperatures as high as 100° F. may be used without injuring the product.

In the flake or powder form, the desiccated product will remain in good condition, fit for consumption, indefinitely, without any special storage or refrigeration treatment.

This desiccated egg product can be dissolved either in warm water or milk, and when so dissolved may be used for baking and cooking, the same as if the eggs had been freshly beaten up. If water is used as the solvent, the solution may be kept for a considerable time in a liquid state if placed in tightly closed vessels.

If it is desired to preserve the yolks of the eggs separate from the whites, it will be necessary to add a little common salt thereto. If only the whites of the eggs are to be treated, or if the eggs are infertile, the straining of the egg substance will not be necessary.

What I claim as new is:—

1. The method of desiccating eggs, comprising mixing the same with lemon juice and drying the resulting compound at a temperature of from 75 to 80° F.

2. The method of preserving eggs, comprising adding lemon juice to the egg meat, and drying the resulting compound.

3. The method of desiccating eggs, comprising thoroughly mixing the meats with strained lemon juice, forming the resulting compound into thin sheets and maintaining the same at a moderate temperature until dried.

4. The method of desiccating eggs, comprising thoroughly mixing the meats with approximately 4 per cent. by weight of strained lemon juice, forming the resulting compound into thin sheets, and maintaining the same at a moderate temperature until dried.

5. The method of desiccating eggs, comprising removing the shells and embryos therefrom, adding approximately 4 per cent. by weight of strained lemon juice, thoroughly mixing the resulting compound, and subjecting the same in thin layers to a temperature of about 75 to 80° F.

6. The method of desiccating eggs, comprising removing the shells, adding juice of a citrus fruit to the meats, and subjecting a thin sheet of the resulting compound to a temperature of approximately 75 to 80° F.

7. The method of desiccating the yolks of eggs, consisting in separating the yolks from the rest of the egg substance, straining out the embryos, adding lemon juice and common salt, thoroughly mixing the resulting compound, and subjecting the same in thin layers to a temperature of 75 to 80° F.

8. The method of desiccating the yolks of eggs, consisting in separating the yolks from the rest of the egg substance, adding lemon juice and common salt, thoroughly mixing the resulting compound, and subjecting the same in thin layers to a temperature of 75 to 80° F.

9. The method of desiccating eggs, comprising the removal of the shells and embryos, straining and beating the remaining egg matter, adding thereto about 4 per cent. by weight of strained lemon juice, thoroughly mixing the resulting compound, and subjecting the same in thin layers to a temperature from 75 to 80° F. until dried.

10. The method of desiccating the whites of eggs, consisting in separating the whites from the rest of the egg substance, adding lemon juice thereto, thoroughly mixing the resulting compound, and subjecting the same in thin layers to a temperature of 75° to 80°.

Signed at New York, N. Y., this 10" day of March, 1911.

THUSNELDA C. PRIMAVESE.